United States Patent
Hori et al.

(10) Patent No.: US 9,842,106 B2
(45) Date of Patent: Dec. 12, 2017

(54) METHOD AND SYSTEM FOR ROLE DEPENDENT CONTEXT SENSITIVE SPOKEN AND TEXTUAL LANGUAGE UNDERSTANDING WITH NEURAL NETWORKS

(71) Applicant: Mitsubishi Electric Research Laboratories, Inc., Cambridge, MA (US)

(72) Inventors: Chiori Hori, Lexington, MA (US); Takaaki Hori, Lexington, MA (US); Shinji Watanabe, Arlington, MA (US); John Hershey, Winchester, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 0 days.

(21) Appl. No.: 14/959,132

(22) Filed: Dec. 4, 2015

(65) Prior Publication Data

US 2017/0161256 A1 Jun. 8, 2017

(51) Int. Cl.
*G06F 17/28* (2006.01)
*G06F 17/27* (2006.01)
*G06N 3/04* (2006.01)
*G06N 3/08* (2006.01)
*G10L 15/26* (2006.01)

(52) U.S. Cl.
CPC ......... *G06F 17/279* (2013.01); *G06N 3/0472* (2013.01); *G06N 3/084* (2013.01); *G10L 15/26* (2013.01); *G06N 3/0454* (2013.01)

(58) Field of Classification Search
CPC ..... G06N 3/0454; G06N 99/005; G10L 15/16
See application file for complete search history.

(56) References Cited

U.S. PATENT DOCUMENTS

| | | | | |
|---|---|---|---|---|
| 6,041,299 | A * | 3/2000 | Schuster | G10L 15/16 704/232 |
| 6,799,171 | B1 * | 9/2004 | Van Kommer | G06N 3/0454 706/20 |
| 2004/0167778 | A1 * | 8/2004 | Valsan | G10L 15/16 704/231 |

(Continued)

OTHER PUBLICATIONS

Shi, Yangyang, et al. "Contextual spoken language understanding using recurrent neural networks." 2015 IEEE International Conference on Acoustics, Speech and Signal Processing (ICASSP). IEEE, Apr. 2015.*

(Continued)

*Primary Examiner* — Jialong He
(74) *Attorney, Agent, or Firm* — Gene Vinokur; James McAleenan; Hironori Tsukamoto

(57) ABSTRACT

A method and system processes utterances that are acquired either from an automatic speech recognition (ASR) system or text. The utterances have associated identities of each party, such as role A utterances and role B utterances. The information corresponding to utterances, such as word sequence and identity, are converted to features. Each feature is received in an input layer of a neural network (NN). A dimensionality of each feature is reduced, in a projection layer of the NN, to produce a reduced dimensional feature. The reduced dimensional feature is processed to provide probabilities of labels for the utterances.

20 Claims, 7 Drawing Sheets

(56) References Cited

U.S. PATENT DOCUMENTS

| | | | | |
|---|---|---|---|---|
| 2015/0066496 A1* | 3/2015 | Deoras | ............... | G10L 15/16 704/232 |
| 2015/0161522 A1* | 6/2015 | Saon | ............... | G06N 3/08 706/12 |
| 2015/0170640 A1* | 6/2015 | Sak | ............... | G10L 15/16 704/232 |
| 2015/0178371 A1 | 6/2015 | Suchana et al. | | |
| 2015/0356401 A1* | 12/2015 | Vinyals | ............... | G06N 3/0454 706/15 |
| 2016/0078339 A1* | 3/2016 | Li | ............... | G06N 3/084 706/20 |

OTHER PUBLICATIONS

Sak et al. "Long Short-Term Memory Recurrent Neural Network Architectures for Large Scale Acoustic Modeling", InterSpeech, 2014.*

Gers, et al. "LSTM Recurrent Networks Learn Simple Context-Free and Context-Sensitive Languages", IEEE Transactions on Neural Networks, vol. 12, No. 6, Nov. 2001.*

Hinton et al. "Deep Neural Networks for Acoustic Modelling in Speech Recognition", IEEE Signal Processing Magazine, Nov. 2012.*

Sarikaya, Ruhi, Geoffrey E. Hinton, and Anoop Deoras. "Application of deep belief networks for natural language understanding." IEEE/ACM Transactions on Audio, Speech and Language Processing (TASLP) 22.4 (2014): 778-784.*

Collobert, Ronan, et al. "Natural language processing (almost) from scratch." Journal of Machine Learning Research 12.Aug. 2011: 2493-2537.*

Mesnil, Grégoire, et al. "Investigation of recurrent-neural-network architectures and learning methods for spoken language understanding." Interspeech. 2013.*

Yao et al., "Spoken language understanding using long short-term memory neural networks," Spoken Language Technology Workshop (SLT), Dec. 2014.

Sepp Hochreiter and Jurgen Schmidhuber, "Long short-term memory," Neural computation, vol. 9, No. 8, pp. 1735-1780, 1997.

A. Graves, A.-R. Mohamed, and G. Hinton, "Speech recognition with deep recurrent neural networks," in Acoustics, Speech and Signal Processing (ICASSP), 2013 IEEE International Conference on, May 2013, pp. 6645-6649.

Yao et al. "Spoken Language Understanding using Long Short-term Memory Neural Networks," 2014 IEEE Spoken Language Technology Workshop, IEEE Dec. 7, 2014. pp. 189-194.

Hori et al. "Context Sensitive Spoken Language Understanding using Role Dependent LSTM Layers," NIPS 2015 Workshop: Machine Learning for Spoken Language Understanding and Interaction, Dec. 11, 2015. (http://media.wix.com/ugd/b6d786_ecbdbbf2e7a44f8a88a82f6c77f8527a.pdf).

* cited by examiner

METHOD AND SYSTEM FOR ROLE DEPENDENT CONTEXT SENSITIVE SPOKEN AND TEXTUAL LANGUAGE UNDERSTANDING WITH NEURAL NETWORKS

FIELD OF THE INVENTION

This invention relates generally to dialog processing, and more particularly to Natural Language Understanding (NLU) methods and systems for dialogs including spoken and textual utterances.

BACKGROUND OF THE INVENTION

Methods and systems of Natural Language Understanding (NLU), which can perform, for example, Spoken Language Understanding (SLU), are used in computerized dialog systems to estimate intentions of utterances. As broadly defined herein, the "spoken" utterances can be in the form of speech or text. If the utterances are spoken, then the utterances can be obtained from, for example, an automatic speech recognition (ASR) system. If the utterances are text, then the utterances can be obtained from, e.g., a text processing systems or keyboard input.

Conventional intention estimation methods can be based on phrase matching, or classification methods, such as boosting, support vector machines (SVM), and Logistic Regression (LR) using Bag of Word (BoW) features of each utterance as inputs. However, the BoW features do not have enough capability to indicate semantic information represented by word sequences due to, for example, missing order of words in the sequences.

To consider a history of a word sequence in each utterance, a Recurrent Neural Networks (RNNs) can be applied for utterance classification using 1-of-N coding instead of the BoW features. Additionally, Long Short-Term Memory (LSTM) RNNs are a form of RNNs designed to improve learning of long-range context, and can be effective for context dependent problems. Those of approaches classify utterances without considering context among utterances. Additionally, it is essential to consider a broader context of a sequence of utterances of an entire dialog to understand intention accurately. Some of the prior art models using RNNs and LSTMs use word sequence context within a single utterance and also consider a broader context of a sequence of utterances of an entire dialog.

Furthermore, each utterance has different expressions in terms of context of party-dependent features such as for task-oriented roles like agents and clients, business dependent terminolgies and expressions, gender dependent languages, relationships among participants in the dialogs. However, conventional methods do not consider such party-dependent features due to the different roles.

SUMMARY OF THE INVENTION

The embodiments of the invention provide a method and system for processing utterances. The utterances are acquired either from an automatic speech recognition (ASR) system or text. The utterances have associated identities of each party, such as role A utterances and role B utterances. The information corresponding to utterances, such as word sequence and identity, are converted to features. Each feature is received in an input layer of a neural network (NN). A dimensionality of each feature is reduced, in a projection layer of the NN, to produce a reduced dimensional feature.

The reduced dimensional feature is processed, where the feature is propagated through hidden layers. In case of recurrent neural network (RNN), hidden layers have reccurent connections and long short-term memory (LSTM) can be applied to hidden layers of the RNN. Then, in an output layer of the NN, posterior probabilities of labels are determined.

DETAILED DESCRIPTION OF THE PREFERRED EMBODIMENTS

The embodiments of our invention provide a method and system for language understanding, e.g., a spoken language understanding (SLU). The method and can estimate intentions of utterances in a dialog. As broadly defined herein, the utterances can be in the form of speech or text. If the utterances are spoken, then the utterances can be obtained from, for example, an automatic speech recognition (ASR) system. If the utterances are text, then the utterances can be obtained from, e.g., a text processing systems or keyboard input.

Context-Sensitive SLU Using NNs

Figure 1A:
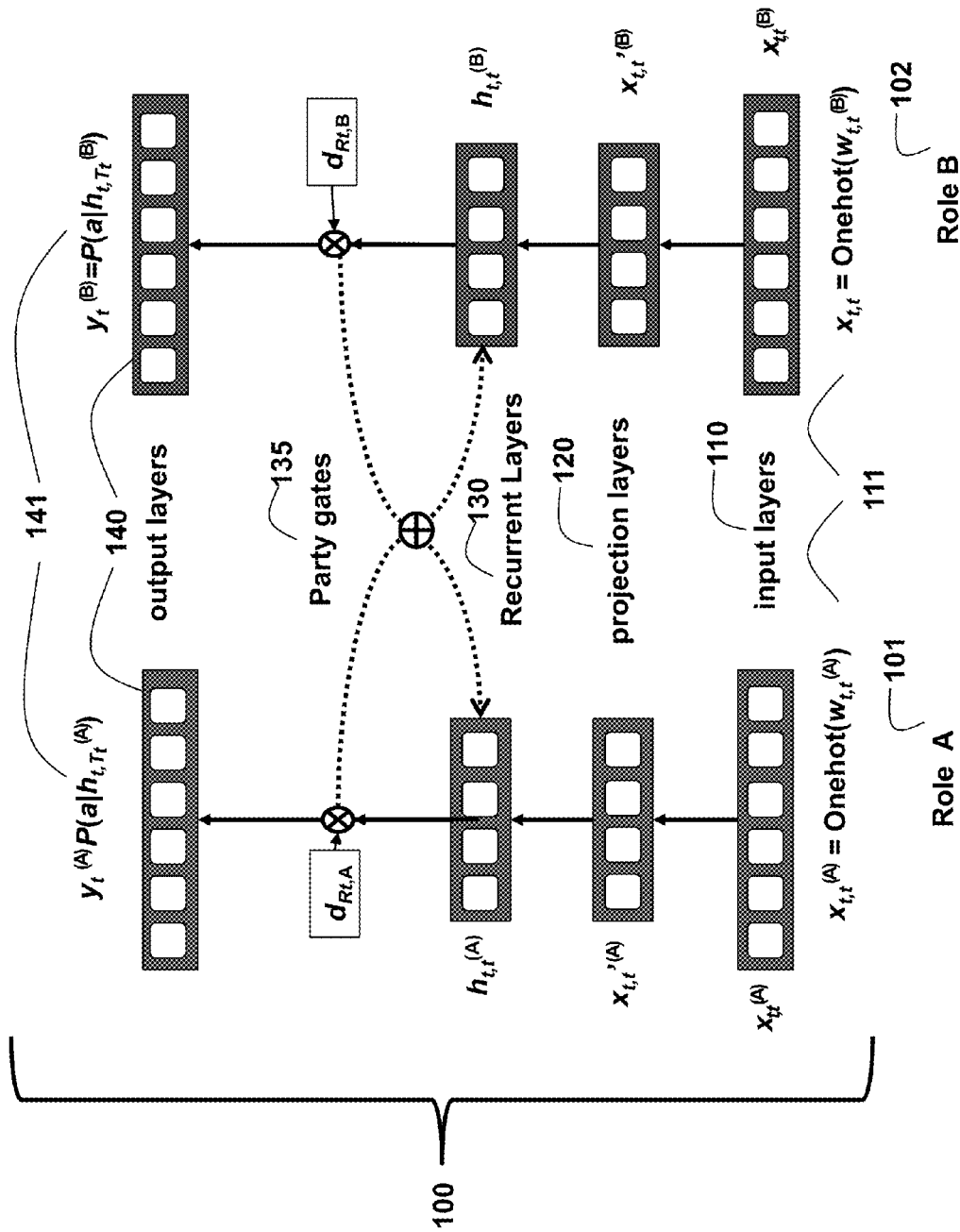
FIG. 1A is a schematic of party-dependent neural networks with a shared context history of an entire dialog among two parties.

FIG. 1A shows party-dependent neural networks 100 with a shared context history of an entire dialog among two parties for role A 101 on the left, and role B 102 on the right, respectively. This embodiment of the invention uses two neural networks (NNs), which considering party-dependent expressions with or without long-term context over a dialog.

Figure 1B:
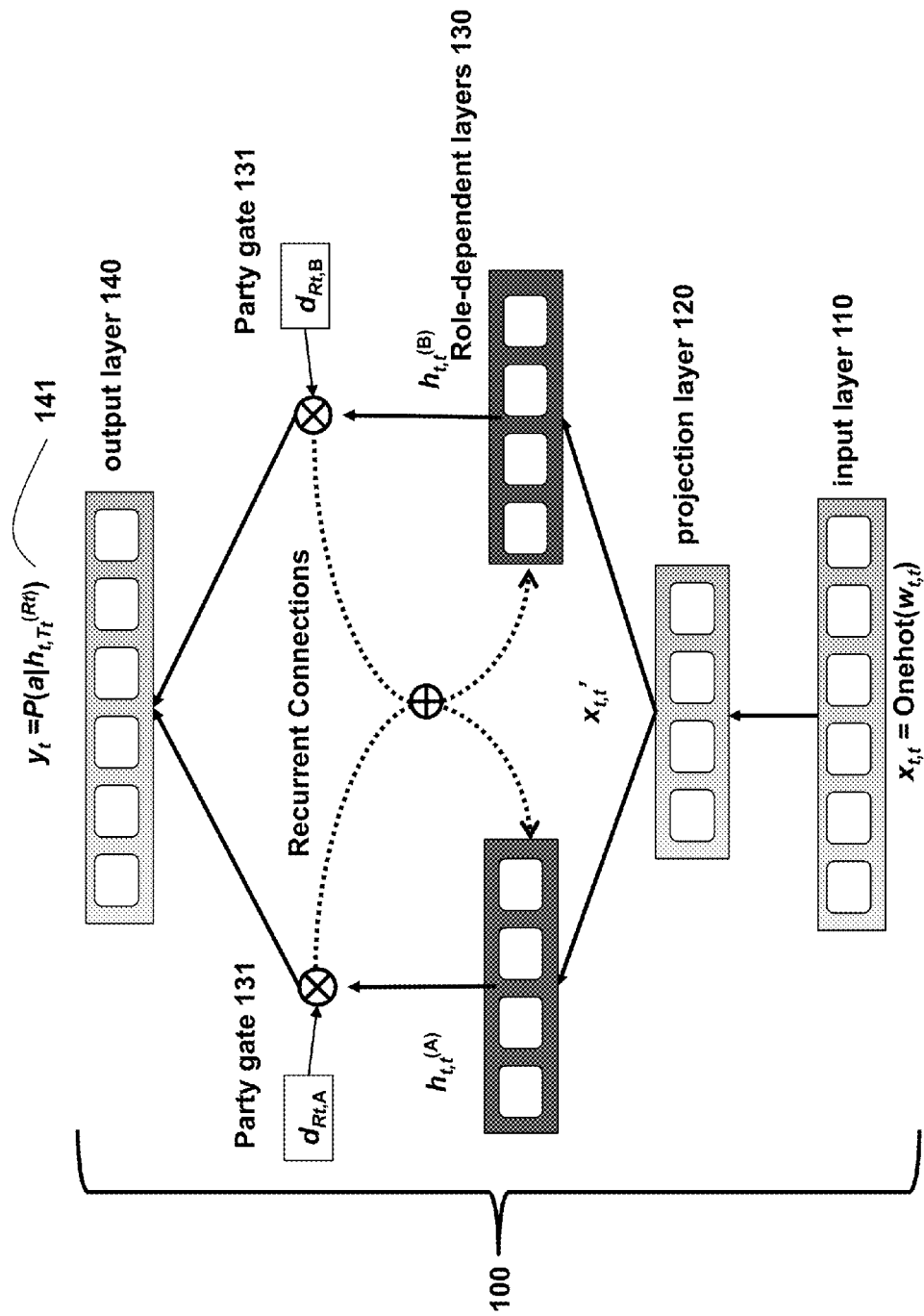
FIG. 1B is a schematic of party-dependent expressions through different layers of a single neural network.

FIG. 1B shows party-dependent expressions through different layers of a single neural network 100. The variables used in the figures are described detail below.

Figure 1C:
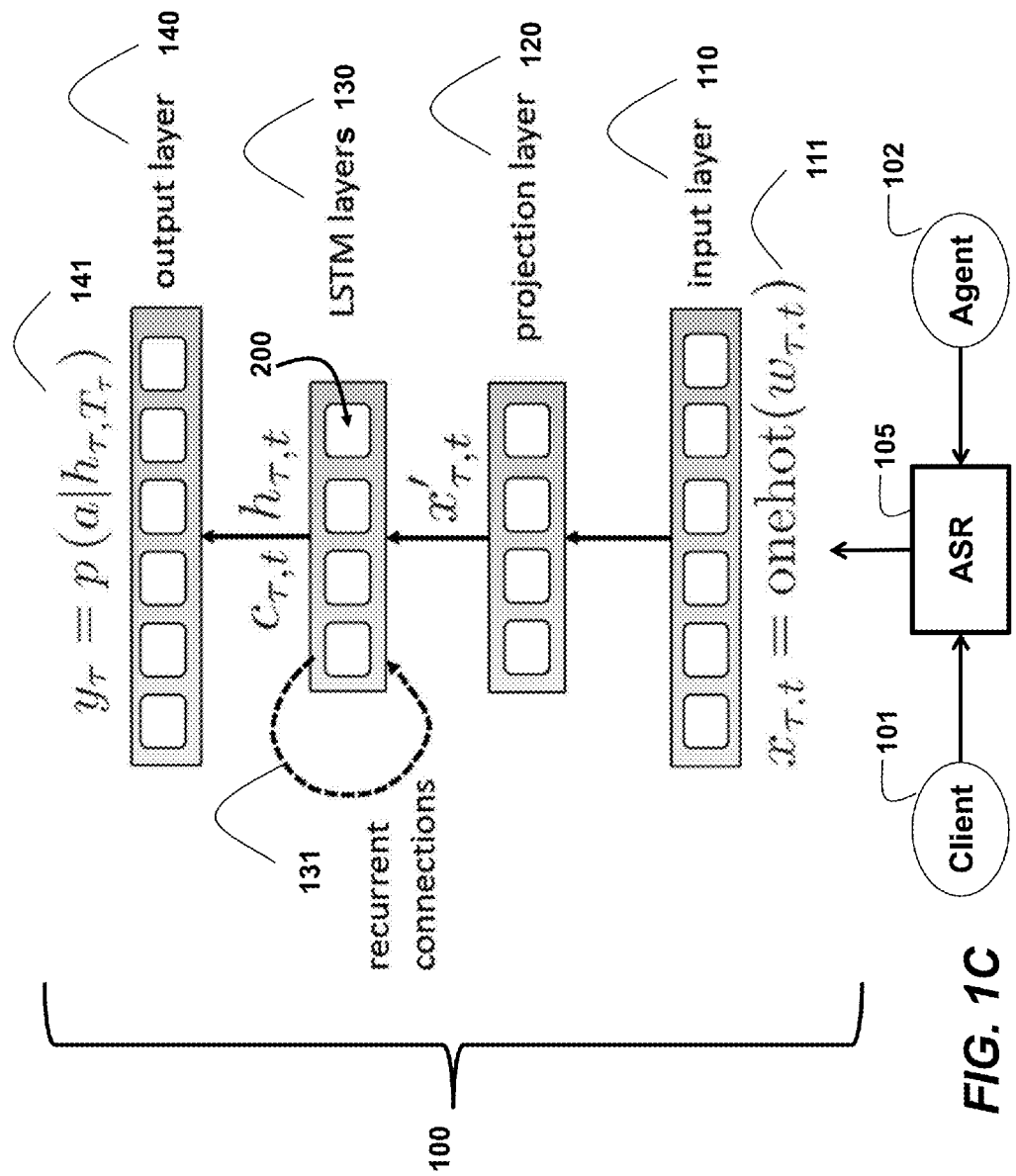
FIG. 1C is a schematic of a context sensitive spoken language understanding (SLU) method and system in the form of a recurrent neural network with two parallel hidden, long short-term memory (LSTM) layers according to embodiments of the invention.

FIG. 1C schematically shows the RNN 100 in an alternative form. Here, the input layer 110 receives input word vectors 111 from the ASR 105. The word vectors correspond to utterances acquired from a client 101 and an agent 102. Typically, the client and agent take turns speaking the utterances during their respective roles A and B.

The method and networks can be implemented in a processor connected to memory and input/output interfaces as known in the art.

By convention, each network is shown with the input layer 110 at the bottom, and the output layer 140 at the top. The input layer 110 receives input word vectors 111 corresponding to the utterances by multiple parties. The utterances have associated identities of each party. The identities relate to the roles performed by the parties. The word vectors correspond to utterances acquired for role A 101, e.g., a client party, and role B 102, e.g., an agent party. Typically, the parties take turns generating the utterances for each role during a dialog.

A projection layer 120 reduces the dimensionality of the word vector to produce a reduced dimensional word vector. A recurrent hidden layer 130 is constructed as long short-term memory (LSTM) with recurrent connections with party gates 131 that can retain and forget context information. The LSTM layers produce activation vectors for the utterances. The output layer 140 estimates posterior probabilities of output labels 141 based on the activation vectors.

To understand the intentions in a dialog of the multiple parties accurately, it is important to consider party-dependent expressions in each utterance and the function of each utterance in the context of a sequence of dialog turns as well.

To consider both context of an entire dialog and party-dependent expressions of each utterance, we provide an efficient NLU approach based on neural networks (NN) that model the context sensitive party-dependent expressions through either party-dependent neural and networks shared context history among parties shown in FIG. 1A, or a single neural network facilitated with party-dependent different layers as shown in FIG. 1B.

Each word is input sequentially into the NNs using either word vector representation such as BoW or 1-of-N coding with or without features of additional attributes such as sematic, syntactic, task-oriented information. The features of word sequence are propagated through one of the party-dependent hidden layers, and semantic information, such as concept tags, are output at the end of each utterance. Concept tags only represent symbols. Semantic information can be symbols, and/or structured information such as a graph.

In case of the RNN, to propagate contextual information through a dialog, the activation vector of the RNN for an utterance serves as input to the RNN for the next utterance to consider contex of an entire dialog. The embodiments train the RNN layers of a context sensitive model to predict sequences of semantic information from the word sequences with considering party-dependent expressions.

The utterances in the dialog corpus are characterized for each party in terms of roles, such as agent or client. In order to precisely model the party-dependent utterances, we provide multiple party-dependent neural networks which are shared context history of an entire dialog among parties as shown FIG. 1A. In addition, we provide a single neural network facilitated with party-dependent different layers depicted in FIG. 1B.

The different party-dependent features are modeled by switching between the party-dependent hidden layers. In these models, words of each utterance are input one at a time, and semantic information are output at the end of each utterance. In case of the RNN, the party-dependent hidden layers jointly represent both the context within each utterance, and the context within the dialog. In other NNs, the party-dependent hidden layers represent only the characteristics of each party's utterance.

Figure 2:
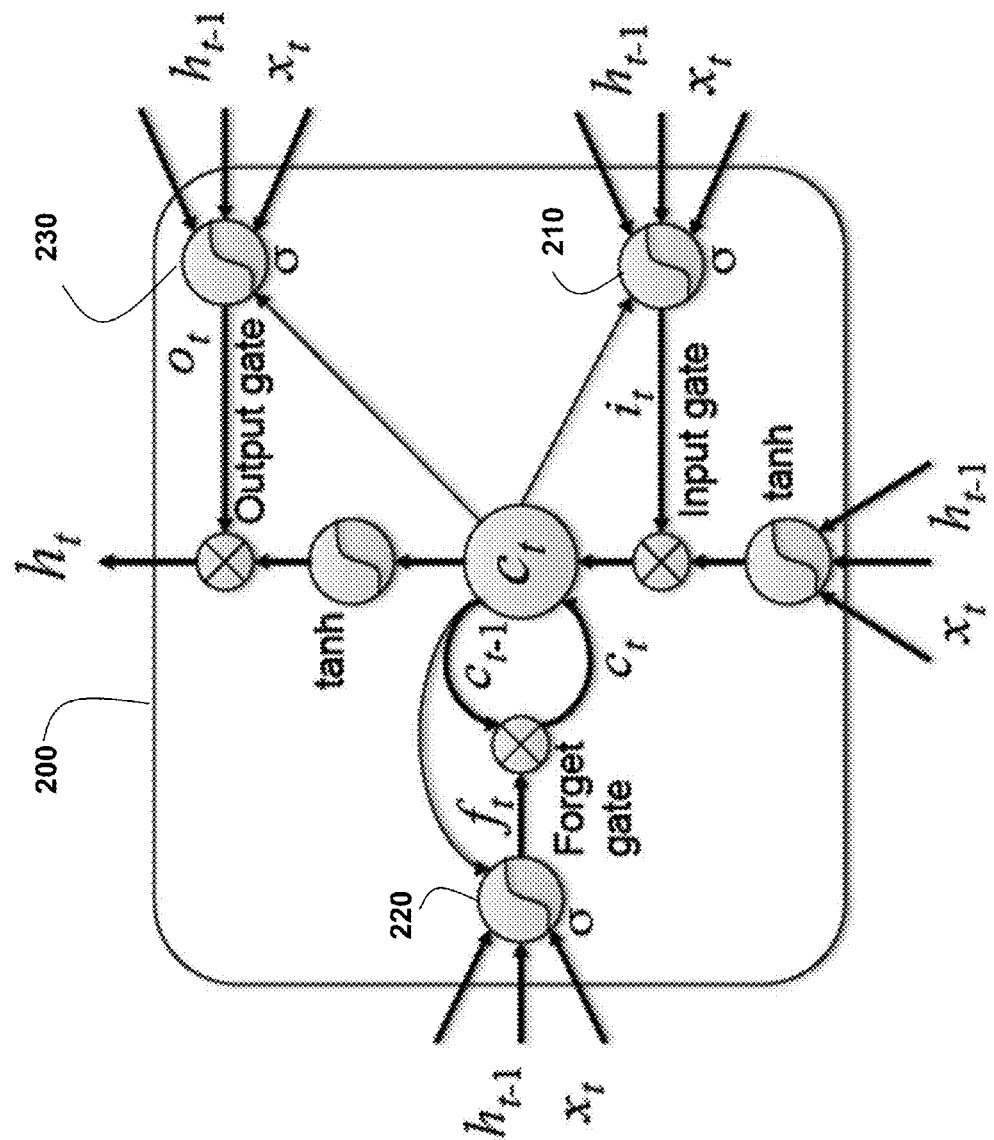
FIG. 2 is a schematic of set of LSTM cells in the hidden layers according to embodiments of the invention.

As shown in FIG. 2, we use a set of LSTM cells 200 in the hidden layer 130, instead of network units as in conventional RNNs. The LSTM cells can remember a value for an arbitrary length of time using gates. The LSTM cell contains input 210, forget 220, and output 230 gates, which respectively determine when the input is significant enough to remember, when to forget the input, and when the input contributes to the output.

A sequence of M utterances is $u_1, \ldots, u_\tau, \ldots, u_M$. Each utterance $u_m$ includes a word sequence $w_{\tau,1}, \ldots, w_{\tau,t}, \ldots, w_{\tau,T_\tau}$ and a concept tag $a_\tau$. The input word vectors $x_{\tau,t}$ 111 received from the ASR are $$x_{\tau,t} = \text{OneHot}(w_{\tau,t}), \tag{1}$$

where the word $w_{\tau,t}$ in a vocabulary V is converted by 1-of-N coding using a function OneHot(w), i.e., $x_{\tau,t} \in \{0,1\}^{|V|}$.

The input vector is projected by the projection layer 120 to a D dimensional vector $$x'_{\tau,t} = W_{pr}x_{\tau,t} + b_{pr}, \tag{2}$$

which is then fed to the recurrent hidden layers 130, where $W_{pr}$ is a projection matrix, and $b_{pr}$ is a bias vector.

At the hidden layers 130, activation vectors $h_{\tau,t}$ are determined using the LSTM cells according $$i_{\tau,t} = \sigma(W_{xi}x'_{\tau,t} + W_{hi}h_{\tau,t-1} + W_{ci}c_{\tau,t-1} + b_i), \tag{3}$$

$$f_{\tau,t} = \sigma(W_{xf}x'_{\tau,t} + W_{hf}h_{\tau,t-1} + W_{cf}c_{\tau,t-1} + b_f), \tag{4}$$

$$c_{\tau,t} = f_{\tau,t}c_{\tau,t-1} + i_{\tau,t}\tan h(W_{xc}x'_{\tau,t} + W_{hc}h_{\tau,t-1} + b_c), \tag{5}$$

$$o_{\tau,t} = \sigma(W_{xo}x'_{\tau,t} + W_{ho}h_{\tau,t-1} + W_{co}c_{\tau,t} + b_o), \text{ and} \tag{6}$$

$$h_{\tau,t} = o_{\tau,t}\tan h(c_{\tau,t}), \tag{7}$$

where $\sigma(\ )$ is an element-wise sigmoid function, and $i_{\tau,t}$, $f_{\tau,t}$, $o_{\tau,t}$ and $c_{96,t}$ are the input gate 210, forget gate 220, output gate 230, and cell activation vectors for the $t^{th}$ input word in the x-th utterance, respectively.

Weight matrices $W_{zz}$ and bias vectors $b_z$ are identified by a subscript $z \in \{x, h, i, f, o, c\}$. For example, $W_{hi}$ is a hidden-input gate matrix, and $W_{xo}$ is an input-output gate matrix.

The output vector 141 is determined at the end of each utterance as $$y_\tau = \text{softmax}(W_{HO}h_{\tau,T_\tau} + b_O), \tag{8}$$

where $W_{HO}$ is a transformation matrix, and $b_O$ is a bias vector to classify the input vector into different categories according to the hidden vector. Softmax( ) is an element-wise softmax function that converts the classification result into label probabilities, i.e., $y_\tau \in [0,1]^{|L|}$ for label set L $$\hat{a}_\tau = \underset{a \in \mathcal{L}}{\text{argmax}}\, y_\tau[a], \tag{9}$$

where $y_\tau[a]$ indicates the component of $y_\tau$ for label a, which corresponds to the probability $P(a|h_{\tau,T_\tau})$ of the label.

To inherit the context information from previous utterances, the hidden and cell activation vectors at the beginning of each utterance are $$h_{\tau,0} = h_{\tau-1,T_{\tau-1}} \tag{10}$$

$$c_{\tau,0} = c_{\tau-1,T_{\tau-1}}, \tag{11}$$

where $\tau > 1$ and $h_{1,0} = c_{1,0} = 0$, as shown in FIG. 2.

Figure 3:
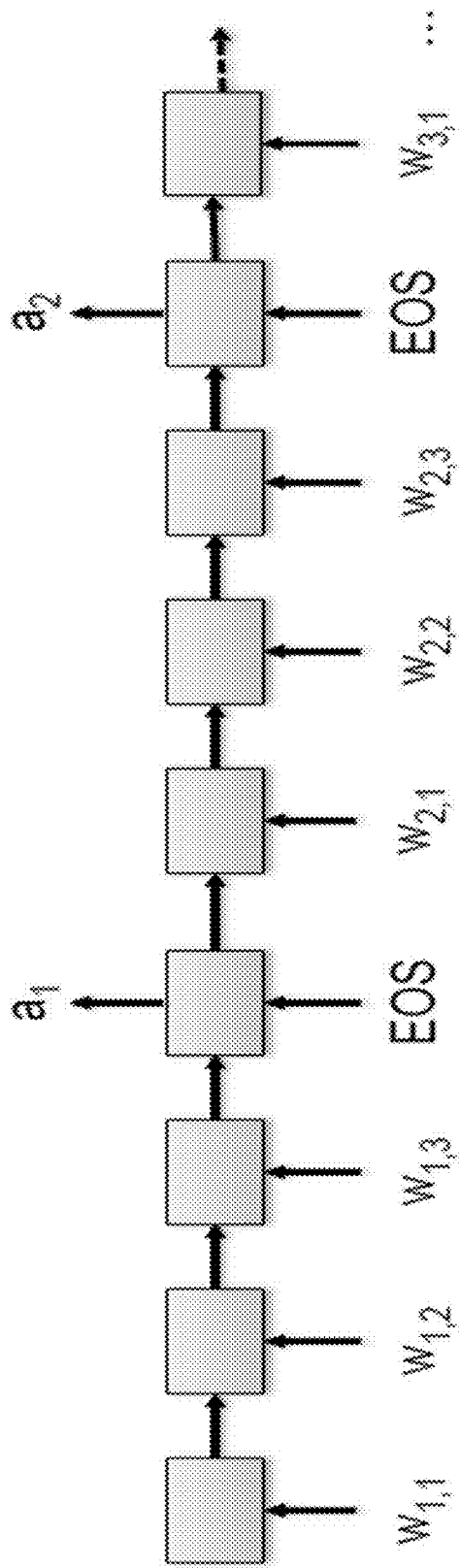
FIG. 3 is a schematic of a propagation process of the context-sensitive SLU according to embodiments of the invention.

FIG. 3 shows a propagation process of our context-sensitive SLU. Words $w_{i,j}$ are sequentially input to the LSTM layers 130, and a label 141 that is output corresponds to the utterance concept at the end of the utterance, where symbol EOS represents "end of sentence."

In contrast with the prior art, our model considers the entire context from the beginning to the end of the dialog. Accordingly, the label probabilities can be inferred using sentence-level intentions an dialog-level context. In contrast, the conventional models only considers each utterance independently.

Role-Dependent LSTM Layers

The LSTM layers can be trained using a human-to-human dialog corpus annotated with concept tags, which represent, e.g., client and agent intentions for a hotel reservation as shown in Table 1 below. The columns, left to right, indicate the speaker, e.g., agent and client, uterances, and concept tags. The uterrances are characterized by each role of agent and client.

TABLE 1

An Example of Hotel Reservation Dialog

| Speaker | Utterance | Concept tags |
|---|---|---|
| Agent | hello, | greeting |
| Agent | new york city hotel, | introduce-self |
| Agent | may i help you? | offer + help |
| Cleint | i would like to make a reservation for a room, | request-action + reservation + hotel |
| Agent | very good, | acknowledge |
| Agent | may i have the spelling of your name, please? | request-information + name |
| Client | it is mike, smith, | give-information + name |
| Agent | uh when would you like to stay? | request-information + temporal |
| Client | from august tenth to august sixteenth, seven days, | give-information + temporal |
| Agent | i see, | acknowledge |
| Agent | you would be arriving on the tenth? is the right? | verify-give-information + temporal |
| Client | that is right, | affirm |
| Agent | great, | acknowledge |
| Agent | and, what sort of room would you like? | request-information + room |
| Client | well, it is just for myself, | give-information + party |
| Client | so a single room would be good, | give-information + room |
| Agent | okay, | acknowledge |
| Agent | a single, | verify-give-information + room |
| Agent | starting on the tenth and | verify-give-information + temporal |
| Agent | you would be checking out on the sixteenth? is that right? | verify-give-information + temporal |
| Client | yes, | affirm |
| Client | and i like the second of third floor, if possible, | give-information + room |
| Agent | i see, | acknowledge |

Figure 4:
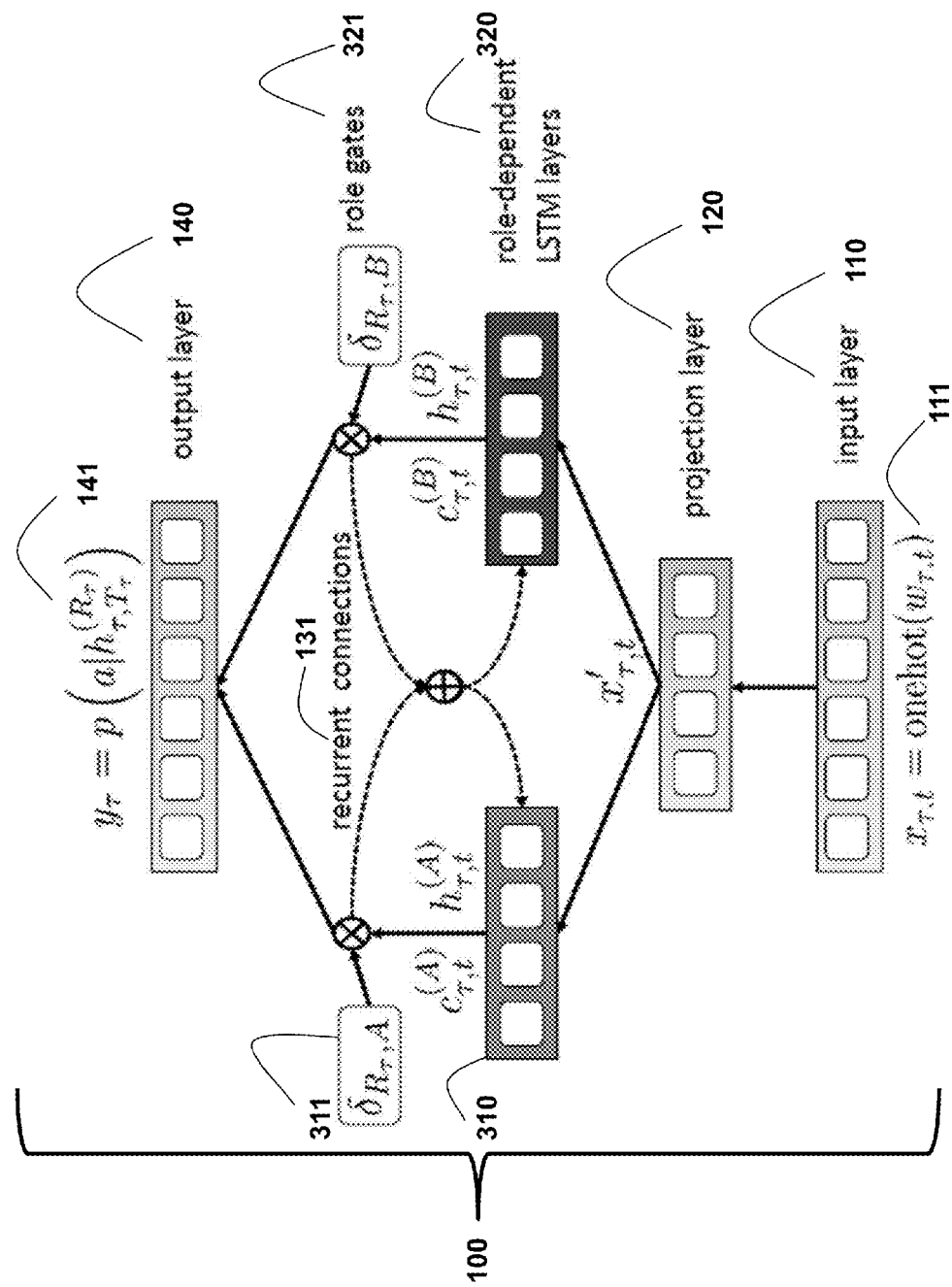
FIG. 4 is a schematic of details of the two parallel LSTM layers according to embodiments of the invention.

As shown in FIG. 4, two parallel LSTM layers 310 and 320 representing client (A) and agent (B) utterances are incorporated in the model. Role gates 311 and 321 control which role, client or agent, is active.

The two LSTM layers have different parameters depending on the speaker roles. Thus, the input vector 111 for the client utterances is processed by the layer 310, and by the layer 320 processes the agent utterances. The active role for a given utterance is controlled by a role variable R, which is used to gate the output to each LSTM layer.

Then, the gated outputs are passed from the recurrent LSTM layers to the output layer 140. The recurrent LSTM inputs thus receive the output from the role-dependent layer active at the previous frame, allowing for transitions between roles.

Error signals in the training phase are back-propagated through the corresponding layers. The role of each speaker does not change during a dialog and the speaker of each utternace is known. However, the model structure leaves open the possibility of dynamically inferring the roles. Accordingly, we can determine the activation at the output layer as $$y_\tau = \text{softmax}(\delta_{R,R_\tau}(W_{HO} h_{\tau,T_\tau}^{(R)} + b_O)), \quad (12)$$

where $h_{\tau,T_\tau}^{(R)}$ is the hidden activation vector given by the LSTM layer of role R, and $\delta_{R,R_\tau}$ is Kronecker's delta, i.e., if $R_\tau$ is the role of the x-th utterance equals role R, R is 1, otherwise R is 0. At the beginning of each utterance, the hidden and cell activation vectors of the role-dependent layer are $$h_{\tau,0}^{(R_\tau)} = h_{\tau-1,T_{\tau-1}}^{(R_{\tau-1})}, \text{ and} \quad (13)$$

$$c_{\tau,0}^{(R_\tau)} = c_{\tau-1,T_{\tau-1}}^{(R_{\tau-1})}. \quad (14)$$

Figure 5:
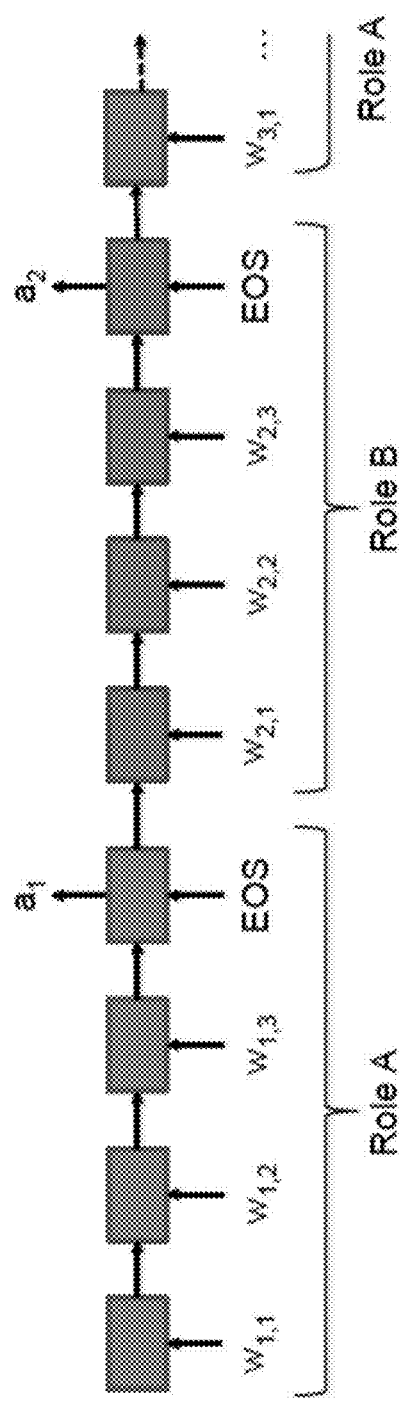
FIG. 5 is a schematic of temporal process of the role-dependent SLU according to embodiments of the invention.

FIG. 5 shows the temporal process of the role-dependent SLU. For each utterance in a given role, only the LSTM layer for that role is active, and the hidden activation and the cell memory are propagated over dialog turns. The figure shows the client utterances (Role A), and the agent utterances (Role B). With this architecture, both LSTM layers can be trained considering a long context of each dialog, and the model can predict role-dependent concept labels accurately.

Effect of the Invention

The invention provides an efficient context sensitive SLU using role-based LSTM layers. In order to determine long-term characteristics over an entire dialog, we implemented LSTMs representing intention using consequent word sequences of each concept tag. We have evaluated the performance of importing contextual information of an entire dialog for SLU and the effectiveness of the speaker role based LSTM layers. The context sensitive LSTMs with roll-dependent layers out-performs utterance-based approaches and improves the SLU baseline by 11.6% and 8.0% (absolute).

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for processing utterances, comprising steps:
   acquiring utterances from multiple parties as word sequences, wherein each of the utterances has an associated identity of each party;
   converting the word sequences and identities to features;
   receiving, in an input layer of a neural network (NN), each of the features;
   reducing, in a projection layer of the NN, a dimensionality of each of the features to produce a reduced dimensional feature;
   processing, the reduced dimensional feature to propagate through hidden layers of the NN, wherein gates control outputs from the hidden layers based on the features of each party, wherein the hidden layers are party-dependent hidden layers or role-dependent hidden layers;
   determining, in an output layer of the NN, posterior probabilities of labels for the utterances based on the controlled outputs from the hidden layers
   estimating intentions of the utterances based on the posterior probabilities; and
   outputting the estimated intentions of the utterances, wherein the steps are performed in a processor.

2. The method of claim 1, wherein the NN is a recurrent NN (RNN), or a RNN with a long short-term memory (LSTM) in hidden layers of the NN with recurrent connections in the hidden layers.

3. The method of claim 2, wherein the LSTM includes recurrent connections with party gates that retain and forget context information.

4. The method of claim 3, wherein the party gates control which one of the multiple parties is active.

5. The method of claim 3, wherein the LSTM includes cells remember a value for an arbitrary length of time using the party gates.

6. The method of claim 1, wherein the utterances are spoken, and further comprising:
converting the utterances to the word sequences in an automatic speech recognition system (ASR).

7. The method of claim 1, wherein the utterances are text to form the word sequences.

8. The method of claim 1, wherein the NN is party-dependent neural networks with a shared context history of an entire dialog among the multiple parties.

9. The method of claim 1, wherein the utterances form a dialog, and a context of the dialog is considered, and the probabilities of the labels are inferred using sentence-level intentions and the context of the dialog.

10. The method of claim 1, wherein words in the word sequences and features are processed sequentially, and the features include semantic, syntactic, and task-oriented attributes.

11. The method of claim 1, wherein the features are propagated through party-dependent hidden layers, and semantic information including concept tags are output at an end of each utterance, and wherein the concept tags only represent symbols, and the semantic information includes symbols and structured information.

12. The method of claim 1, wherein the utterances are characterized in terms of roles of the multiple parties.

13. A method for processing utterances, comprising steps:
acquiring utterances from multiple parties as word sequences, wherein each of the utterances has an associated identity of each party;
converting the word sequences and identities to features;
receiving, in an input layer of a neural network (NN), each of the features, wherein the NN is party-dependent neural networks with a shared context history of an entire dialog among the multiple parties;
reducing, in a projection layer of the NN, a dimensionality of each of the features to produce a reduced dimensional feature;
processing, the reduced dimensional feature to propagate through hidden layers of the NN, wherein gates control outputs from the hidden layers based on the features of each party, wherein the hidden layers are party-dependent hidden layers or role-dependent hidden layers;
determining, in an output layer of the NN, posterior probabilities of labels for the utterances based on the controlled outputs from the hidden layers;
estimating intentions of the utterances based on the posterior probabilities; and
outputting the estimated intentions of the utterances, wherein the steps are performed in a processor.

14. The method of claim 13, wherein the NN is a recurrent NN (RNN), or a RNN with a long short-term memory (LSTM) in hidden layers of the NN with recurrent connections in the hidden layers.

15. The method of claim 13, wherein the utterances are spoken, and further comprising:
converting the utterances to the word sequences in an automatic speech recognition system (ASR).

16. The method of claim 13, wherein the utterances are text to form the word sequences.

17. The method of claim 13, wherein the utterances form a dialog, and a context of the dialog is considered, and the probabilities of the labels are inferred using sentence-level intentions and the context of the dialog.

18. The method of claim 13, wherein words in the word sequences and features are processed sequentially, and the features include semantic, syntactic, and task-oriented attributes.

19. The method of claim 13, wherein the features are propagated through party-dependent hidden layers, and semantic information including concept tags are output at an end of each utterance, and wherein the concept tags only represent symbols, and the semantic information includes symbols and structured information.

20. The method of claim 13, wherein the utterances are characterized in terms of roles of the multiple parties.

* * * * *